Jan. 22, 1924.  
J. H. WOOLLISCROFT  
1,481,582  
PNEUMATIC CHECK OR THE LIKE DEVICE  
Filed April 22, 1920
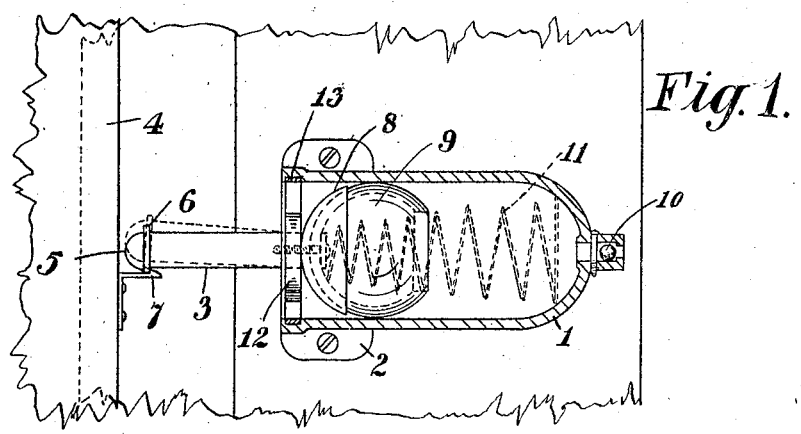
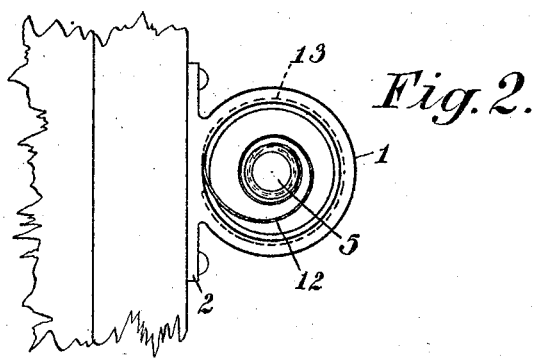
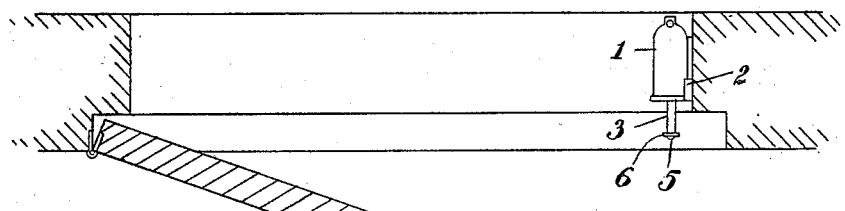

Patented Jan. 22, 1924.

1,481,582

UNITED STATES PATENT OFFICE.

JOHN H. WOOLLISCROFT, OF LIVERPOOL, ENGLAND.

PNEUMATIC CHECK OR THE LIKE DEVICE.

Application filed April 22, 1920. Serial No. 375,783.

*To all whom it may concern:*

Be it known that I, JOHN HAROLD WOOLLISCROFT, subject of the King of Great Britain, residing in Liverpool, in the county of Lancaster and Kingdom of England, have invented certain new and useful Improvements in Pneumatic Checks or the like Devices, of which the following is a specification.

The present invention relates to improvements in that type of pneumatic door check or the like device in which the motion of the door on its hinges is checked as it reaches the closed position, by pneumatic means.

Devices of this kind have usually comprised a cylinder fitted to one part and a piston or plunger fitted to the other part so that as the door reaches a predetermined position the piston or plunger enters the cylinder and the door receives the resistance of a cushion of air.

In the device of the present invention the piston rod or plunger which moves relatively to the cylinder, is mounted within the said cylinder by means of a spherical bearing, which bearing may be in the form of the plunger or piston itself, in the form for instance of a rubber sphere or partial sphere.

The invention is more particularly described with reference to the accompanying drawings in which:—

Figure 1 is a sectional elevation of the device.

Figure 2 is a detail.

Figure 3 is a view showing the device in use.

The device comprises a cylinder 1, provided with brackets 2, for fixing on the door jamb and having a piston rod or plunger 3, which receives the impact of the door 4.

The arrangement of the present invention is described where the cylinder 1, is fitted to the door jamb and no part is attached to the door, but it is obvious that the device can in certain cases be fitted to the door to impact against the door frame, but the arrangement shown is the one preferred.

The piston rod or plunger 3, has at its outer end a rubber knob or buffer 5, behind which is arranged a small washer or collar 6, which is adapted to cooperate with a hook or the like catch 7, fitted to the door 4, so that as the door is opening, it will withdraw the plunger 3, from the cylinder 1, until a certain point is reached when a further pull on the piston rod 3, will cause this to rise into the position indicated in dotted lines in Fig. 1 and so release itself from said catch 7.

To accommodate the alterations in angle of impact or contact of the door 4, with the end 5, of the plunger this can move in a spherical bearing relatively to the cylinder 1, in that the piston rod 3, has at its end a cup 8, to receive a rubber ball 9, or partial sphere which not only acts therefore as a cup leather but also as a spherical joint.

The end of the cylinder is closed by a one-way valve such as a ball valve 10, in the usual manner, and may also receive a spring 11, which bears on the plunger head 9, or where this is in the form of a partial rubber sphere, it may bear inside it to assist in pushing out the plunger 3, when a cap 7 is not used.

To maintain the plunger or piston rod 3, normally in a central position coaxial with the axis of the cylinder 1, it passes through the centre coil of a flat spiral spring 12, which automatically holds itself within an annular groove 13, in the cylinder. The piston rod 3, therefore can slide through this spring but will be maintained by it normally substantially coaxial with the axis of the cylinder 1.

I declare that what I claim is:—

1. A door check comprising in combination a cylinder closed at one end, a piston rod adapted to receive the blow to be checked and free from all rigid attachment, a spherical piston rigidly mounted on said piston rod allowing a universal motion of the piston rod relatively to the axis of the cylinder and of displacement axially along said cylinder, a one-way release valve at the inner end of said cylinder and means to retain said piston permanently inside said cylinder.

2. A door check comprising in combination a cylinder closed at one end, a hollow partial sphere of india rubber fitting said cylinder, means to retain said hollow sphere permanently within said cylinder, a metal cap partially enshrouding the outer surface of said partial sphere, means to clamp said partial sphere within said hollow cap, a piston rod connected to the said cap and means to flexibly support said piston rod axially within said cylinder to allow it to take up any angular or axial position within said cylinder.

3. A door check comprising in combination a cylinder closed at one end, a spherical piston engaging the walls of the said cylinder, a piston rod mounted rigidly in said spherical piston and extending beyond said cylinder and a spring gland engaging said piston rod and elastically maintaining it coaxial with said piston.

In witness whereof, I have hereunto signed my name this 30th day of March, 1920, in the presence of two subscribing witnesses.

J. H. WOOLLISCROFT.

Witnesses:
 HORTON ARMSTRONG,
 JOHN McLACHLAN.